(12) United States Patent
Johnston et al.

(10) Patent No.: US 9,948,738 B2
(45) Date of Patent: Apr. 17, 2018

(54) REAL-TIME DATA ACQUISITION USING PEER-TO-PEER TECHNOLOGIES

(71) Applicant: KAV Enterprise, Inc., Wenonah, NJ (US)

(72) Inventors: Vincent J. Johnston, Wenonah, NJ (US); Alan B. Johnston, Bellevue, WA (US)

(73) Assignee: KAV Enterprise, Inc., Wenonah, NJ (US)

( * ) Notice: Subject to any disclaimer, the term of this patent is extended or adjusted under 35 U.S.C. 154(b) by 0 days.

(21) Appl. No.: 15/645,159

(22) Filed: Jul. 10, 2017

(65) Prior Publication Data

US 2018/0014147 A1   Jan. 11, 2018

Related U.S. Application Data

(60) Provisional application No. 62/360,489, filed on Jul. 11, 2016.

(51) Int. Cl.
*H04W 4/00* (2018.01)
*H04L 29/08* (2006.01)
*H04L 29/06* (2006.01)

(52) U.S. Cl.
CPC .......... *H04L 67/2823* (2013.01); *H04L 67/12* (2013.01); *H04W 4/80* (2018.02); *H04L 65/608* (2013.01); *H04L 67/104* (2013.01)

(58) Field of Classification Search
CPC ..... H04W 4/003; H04W 4/008; H04W 74/04; H04W 12/08; H04W 48/18; H04W 88/10;

(Continued)

(56) References Cited

U.S. PATENT DOCUMENTS

2016/0212690 A1* 7/2016 Ukil .................. H04W 48/16
2017/0140356 A1* 5/2017 Desai ................. G06Q 20/202
2017/0257886 A1* 9/2017 Adjakple ............ H04W 12/08

OTHER PUBLICATIONS

"Low Level Reader Protocol (LLRP)," www.gsl.org, 2010 [retrieved on Jun. 14, 2017] Retrieved from the Internet: <https://www.gs1.org/sites/default/files/docs/epc/llrp_1_1-standard-20101013.pdf> (198 pages).

(Continued)

*Primary Examiner* — Thanh Le
(74) *Attorney, Agent, or Firm* — Mendelsohn Dunleavy, P.C.; Steve Mendelsohn

(57) ABSTRACT

In certain embodiments, a network-based data acquisition system has an acquisition device and an access device. The acquisition device has (a) a reader-specific module that (i) receives reader-specific data generated by a data reader (e.g., an RFID or other type of reader) and (ii) converts the data from the reader-specific format into reader-agnostic data in a reader-agnostic format and (b) at least one reader-agnostic module that (i) receives the reader-agnostic data from the reader-specific module and (ii) transmits the reader-agnostic data to the access device. In one implementation, the access device runs a web browser that accesses a web server on a controller of the acquisition device, and the reader-agnostic data is transmitted from the controller to the access device via a point-to-point communication path, such as a WebRTC data channel. The reader-specific module can be replaced/modified to support a new data reader without having to replace/modify any reader-agnostic module.

17 Claims, 12 Drawing Sheets

(58) Field of Classification Search
CPC .......... H04W 8/18; H04L 67/10; G06F 21/10; G06F 21/62; G06Q 20/20; G06Q 20/202
See application file for complete search history.

(56) References Cited

OTHER PUBLICATIONS

"WebRTC 1.0: Real-time Communication Between Browsers," www.w3.org, 2017 [retrieved on Jun. 14, 2017] Retrieved from the Internet: https://www.w3.org/TR/2017/WD-webrtc-20170605/> (222 pages).

* cited by examiner

REAL-TIME DATA ACQUISITION USING PEER-TO-PEER TECHNOLOGIES

CROSS-REFERENCE TO RELATED APPLICATIONS

This application claims the benefit of the filing date of U.S. provisional application No. 62/360,489, filed on Jul. 11, 2016 as the teachings of which are incorporated herein by reference in their entirety.

BACKGROUND

Field of the Invention

The present invention relates to network-based computer systems having (i) data acquisition devices, such as those having radio frequency identification (RFID) readers that acquire RFID data from RFID tags, and (ii) data access devices that receive the data from the data acquisition devices via a communications network, such as the Internet or other wide- or local-area network.

Description of the Related Art

This section introduces aspects that may help facilitate a better understanding of the invention. Accordingly, the statements of this section are to be read in this light and are not to be understood as admissions about what is prior art or what is not prior art.

FIG. 1 is a simplified, high-level block diagram of a conventional network-based RFID data acquisition system 100 that uses a traditional client/server architecture. The data acquisition system 100 comprises a network server 110 that communicates via a communications (comm) network 120, such as the Internet, with the two represented clients: an RFID data acquisition device 130 and an RFID data access device 140.

The RFID data acquisition device 130 includes an RFID reader (not shown) that communicates wirelessly with a near-by RFID tag 132 to receive RFID data, such as the unique RFID number for the tag. The acquisition device 130 transmits the acquired RFID data to the network server 110 via the comm network 120, and the network server 110 stores the RFID data into the network database 112. This flow of RFID data is represented in FIG. 1 with solid arrows. To provide the RFID data to the RFID data access device 140, the network server 110 retrieves the stored RFID data from the network database 112 and transmits the retrieved RFID data to the access device 140 via the comm network 120. This flow of RFID data is represented in FIG. 1 with dotted arrows. The latency associated with the data acquisition and retrieval scheme of FIG. 1 can be problematic for certain applications involving real-time data, in which the value of the data relates to its immediacy. In addition, in some situations, access to the network server 110 by the acquisition device 130 and/or the access device 140 might not be available.

Although not explicitly represented in FIG. 1, in addition to the RFID reader, the RFID data acquisition device 130 also has a controller that runs (i) RFID reader software that supports communication with the RFID reader to receive the acquired RFID data and (ii) client software that supports communication with the network server 110 via the comm network 120 to transmit the RFID data. The RFID data access device 140 also runs RFID reader software that enables the access device to communicate with the network server 110 to receive the RFID data acquired by the acquisition device 130 and retrieved from the network database 112. Different RFID readers from different manufacturers require different RFID reader software applications to be run on the controller of the RFID data acquisition device 130 and on the RFID data access device 140. If the RFID reader in the acquisition device 130 is replaced by an RFID reader of another manufacturer, then the RFID reader software in both the acquisition device 130 and the access device 140 typically need to be replaced by RFID reader software of the second manufacturer.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
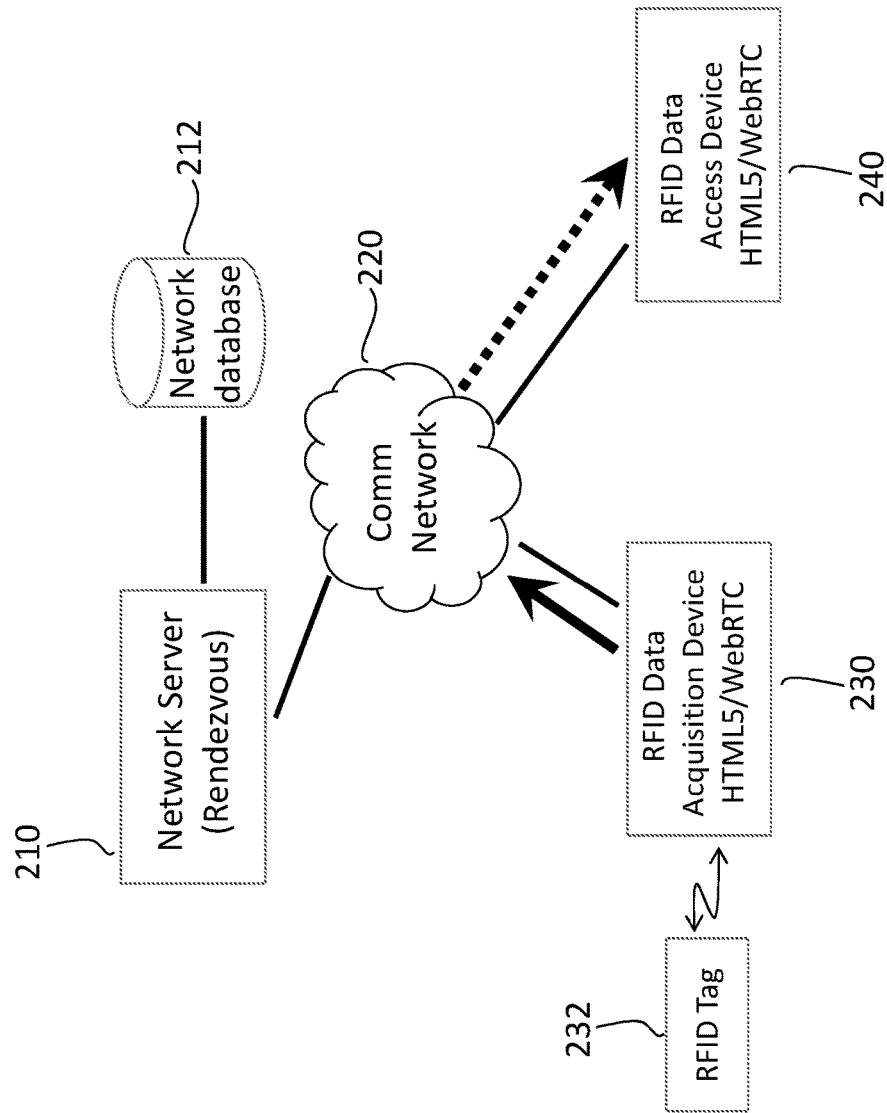
FIG. 2 is a simplified, high-level block diagram of a network-based RFID data acquisition system according to one embodiment of the invention.

FIG. 2 is a simplified, high-level block diagram of a network-based RFID data acquisition system 200 according to one embodiment of the invention. The data acquisition system 200 comprises a network server 210, an RFID data acquisition device 230, and an RFID data access device 240 that communicate via a communications network 220. The comm network 220 can be, for example, a wide-area network (WAN), such as the Internet, or a local-area network (LAN) or a combination of a WAN and a LAN.

In system 200, the acquisition device 230 and the access device 240 are both HTML5- and WebRTC-compatible devices. An HTML5-compatible device is a device that conforms to the fifth version of the HTML (HyperText Markup Language) standard, published in October 2014 by the World Wide Web Consortium (W3C), the teachings of which are incorporated herein by reference in their entirety. An HTML5-compatible device is a device that can access other network nodes via the Internet or other suitable communications network. A WebRTC-compatible device is a device that conforms to WebRTC 1.0: Real-time Communication Between Browsers, W3C Working Draft (May 31, 2016), the teachings of which are incorporated herein by reference in their entirety. A WebRTC-compatible device is a device that can support peer-to-peer (P2P) communications with another WebRTC-compatible network node via the Internet or other suitable communications network.

Because the acquisition device 230 and the access device 240 are HTML5/WebRTC devices, they can communicate via a P2P communications path established through the comm network 220 that does not involve the network server 210 after the P2P path has been established. In particular, the devices communicate with the network server 210 via the comm network 220 using the conventional WebRTC Rendezvous function to establish a P2P communication path that then enables the acquisition device 230 to transmit the RFID data acquired by the acquisition device 230 from the RFID tag 232, to the access device 240 via the comm network 220 without having to transmit the RFID data to the network server 210 for storage to and retrieval from the network database 212. In FIG. 2, the flow of RFID data from the acquisition device 230 to the comm network 220 is represented by the solid arrow, while the flow of RFID data from the comm network 220 to the access device 240 is represented by the dotted arrow. As represented in FIG. 2, the RFID data does not even reach the network server 210, let alone the network database 212. Note that, as explained further below, the P2P communications path is between an HTML5 web server running on the acquisition device 230 and an HTML5 web browser running on the access device 240.

Although FIG. 2 shows only one RFID tag 232, only one RFID data acquisition device 230, and only one RFID data access device 240, in general, the RFID data acquisition system 200 can have one or more RFID data access devices that receive RFID data from one or more RFID data acquisition devices that acquire that RFID data from one or more RFID tags.

According to certain embodiments, the RFID data access device 240 is a laptop, tablet, or other suitable networked computing device that runs a web browser, while the RFID data acquisition device 230 is an IoT (Internet of Things) device having (i) an RFID reader that is capable to querying RFID tags located within range of the RFID reader to receive RFID data from those RFID tags and (ii) a web server that transmits the RFID data via the Internet in a P2P manner to the access device's web browser without having the RFID data ever reach the network server 210 or its network database 212. The real-time communications and data transfers can be secure with end-to-end encryption built in between the acquisition device's web server and the access device's web browser.

IoT communications threaten to consume Internet bandwidth and cause extensive growth in server farms to receive this information. With the use of WebRTC as a standard to implement the IoT acquisition device 230, the communication and data can be sent directly to the web browser on the access device 240, without having to be forwarded to a server, like the network server 210 of FIG. 2, and then relayed from the server to the access device's browser. In some implementations, the communications can stay within a local-area network and thus consume no core Internet bandwidth or processing power. This architecture and technology result in high efficiency in both energy and bandwidth usage.

Figure 3:
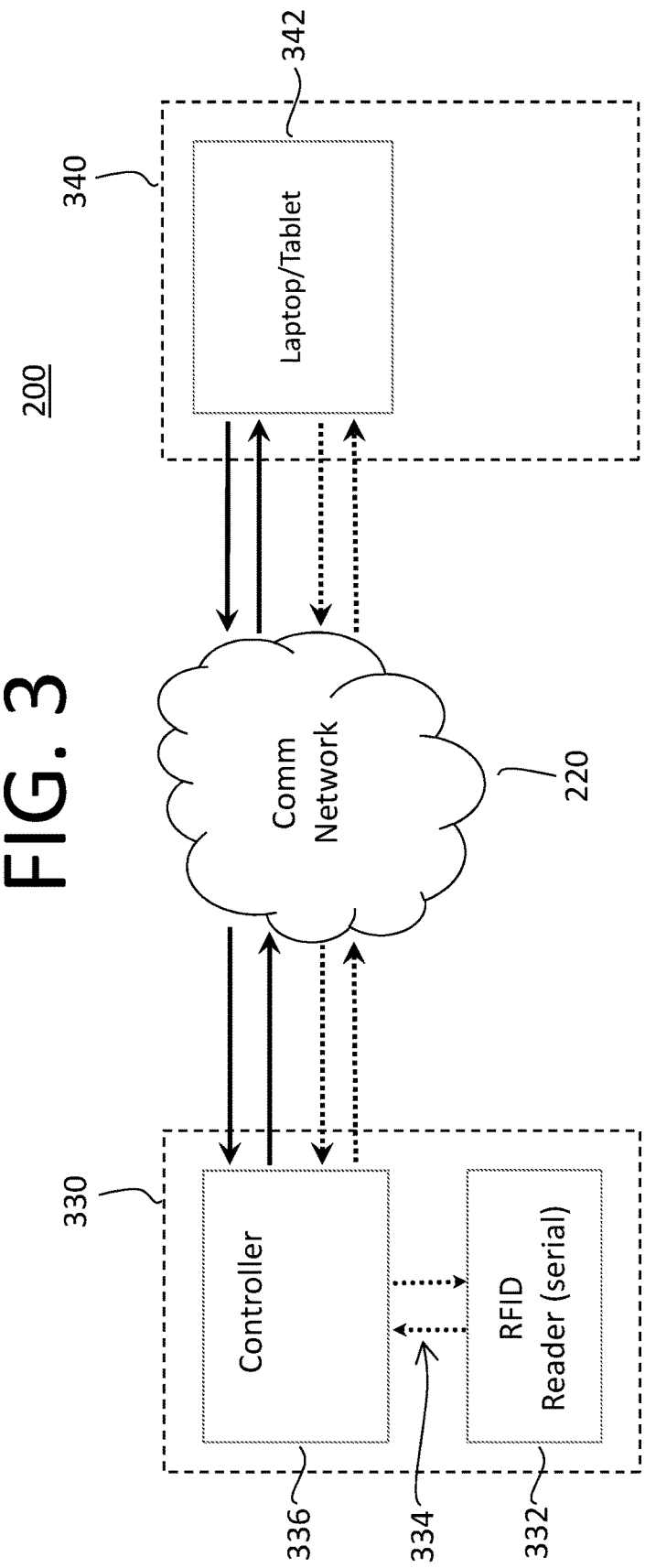
FIG. 3 is a simplified, high-level block diagram of one possible implementation of the RFID data acquisition system of FIG. 2.

FIG. 3 is a simplified, high-level block diagram of one possible implementation of the RFID data acquisition system 200 of FIG. 2, where (i) the RFID data acquisition device 230 is implemented using RFID data acquisition device 330 and (ii) the RFID data access device 240 is implemented using RFID data access device 340. The acquisition device 330 comprises an RFID reader 332 and a controller 336 that communicate via a (e.g., serial) wireline comm link 334, while the access device 340 is a laptop, tablet, or other suitable networked computing device 342 that runs a web brower. The RFID reader 332 is responsible for wirelessly (e.g., UHF EPC Gen 2, although other RFID standards exist in HF (high frequency) and LF (low frequency) bands) communicating with one or more RFID tags (not shown) to acquire RFID data, while the controller 336 is responsible for communicating with other network nodes such as the access device 340 and the network server 210 of FIG. 2 via the comm network 220. The controller 336 is a processor-based computing device executing an operating system (OS) such as Linux, Windows, or other suitable, real-time operating system. Because the RFID reader 332 and the controller 336 are connected by the wireline comm link 334, the acquisition device 330 is typically implemented as a single, integrated device. The solid arrows in FIG. 3 represent the data exchange between the acquisition device's controller 336 and the access device 340, where the controller is used to load and display an RFID application on the access device's web browser. The horizontal dotted arrows in FIG. 3 represent the WebRTC communications between the controller 336 and the access device 340 that are used to control and obtain the RFID data, while the vertical dotted arrows in FIG. 3 represent the serial communications between the RFID reader 332 and the controller 336 via the wireline comm link 334.

Figure 4:
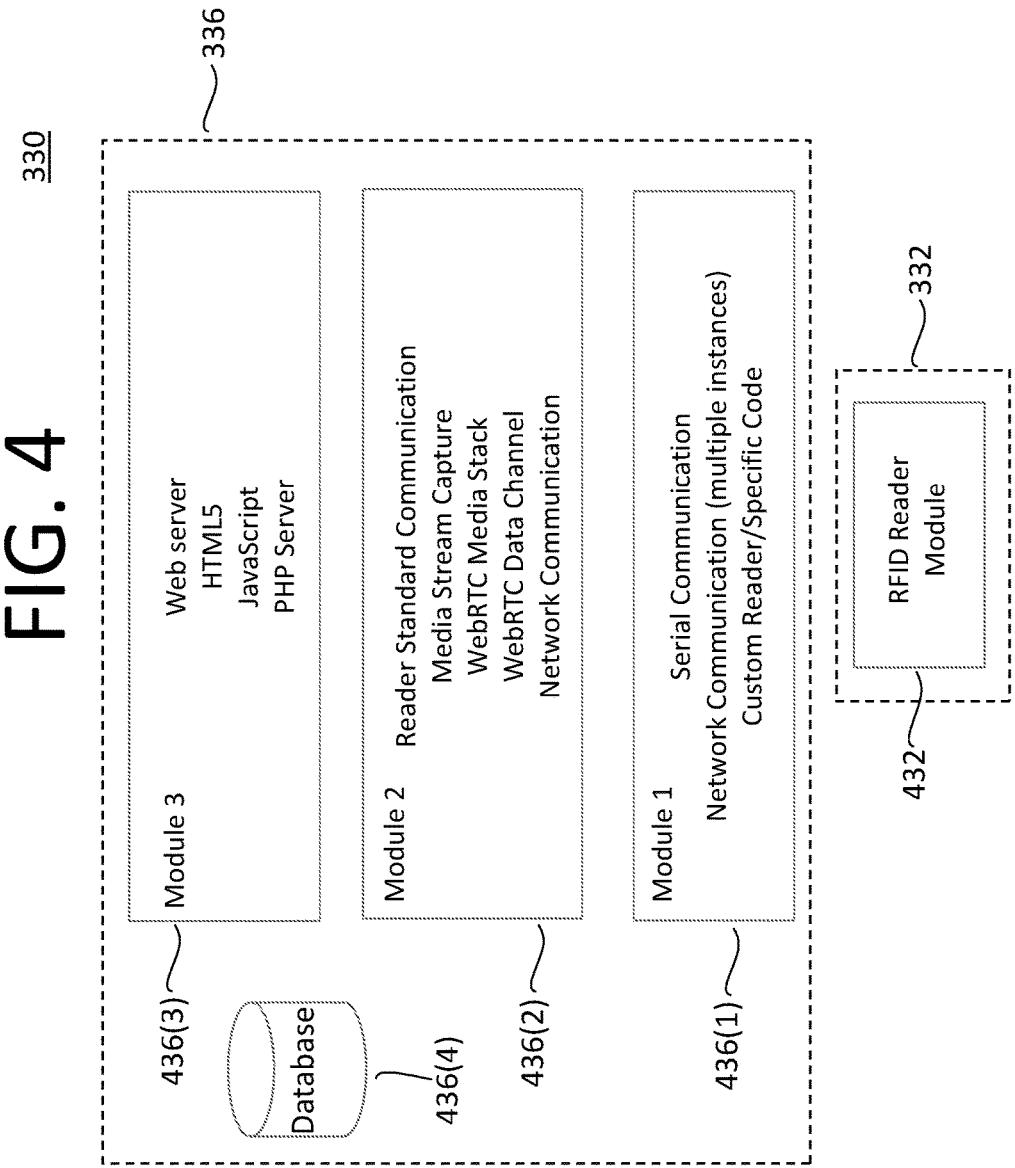
FIG. 4 is a high-level block diagram of the software implemented on the RFID data acquisition device of FIG. 3.

FIG. 4 is a high-level block diagram of the software implemented on the RFID data acquisition device 330 of FIG. 3. The RFID reader module 432 represents the software run on the RFID reader 332 of FIG. 3, while the three modules 436(1)-436(3) represent the software run on the controller 336 of FIG. 3, which also includes controller memory 436(4).

The RFID reader module 432 represents the reader-specific software/firmware that operates the RFID reader 332 of FIG. 3. The RFID reader module 432 is typically customized by each different RFID reader manufacturer for its own RFID reader products.

The first module 436(1) (Module 1) represents reader-specific software implemented by the controller 336 that supports communication with the RFID reader 332. Like the RFID reader module 432, the first module 436(1) is typically customized by each different RFID reader manufacturer for its own RFID reader products. The first module 436(1) is an embedded application that implements an reader-specific API (application program interface) to communicate with the RFID reader module 432. For the wired connection 334 of FIG. 3 a serial communications link is used. The first module 436(1) also implements an API between the first and second modules 436(1) and 436(2) that is independent of the RFID reader manufacturer. This communication is implemented using a FIFO (first in, first out) message queuing mechanism that is operating system dependent, TCP/IP sockets, or any other suitable inter-process communications link. A program loop interacts with both of these APIs. Commands are processed and responses (solicited and unsolicited) are generated.

The RFID reader API is specific to the manufacturer of the RFID reader 332. An example of the RFID reader 332 is the SkyeTek SkyeModule C and .NET API, which supports the SkyeTek Protocol V3 RFID reader from JADAK Technologies of Syracuse, N.Y.

The first module 436(1) includes the following software that supports the following functions:

Serial Communication: Supports the serial communication with the RFID reader 332 via the wireline comm link 334.

Network Communication: Provides a standard, reader-agnostic interface that enables other network nodes, such as the RFID data access device 340 of FIG. 3 and the network server 210 of FIG. 2, to communicate with the RFID reader 332.

Reader-Specific Code: Supports reader-specific communications with the RFID reader 332 and converts the reader-specific RFID data received from the RFID reader 332 into a standardized format known to other network nodes, such as the RFID data access device 340.

The second module 436(2) represents reader-agnostic software implemented by the controller 336 that support the WebRTC P2P communications with the RFID data access device 240 of FIG. 2. The second module 436(2) is an embedded application that provides a WebRTC media stack and a WebRTC data channel used for the API between the second module 436(2) and the fourth module 524(4) of FIG. 5. The second module 436(2) also includes a program loop that interacts with the API to the first module 436(1). The second module 436(2) uses either a FIFO or TCP/IP sockets interface to exchange the Reader Protocol messages with the first module 436(1).

The second module 436(2) includes the following software that supports the following functions:

Reader Standard Communication: Provides a standard, reader-agnostic interface used to communicate with the first module 436(1).

Media Stream Capture: Provides access to any audio, camera, or video devices that are attached to the controller 336.

WebRTC Media Stack: This is an implementation of a general purpose WebRTC gateway such as Janus modified to include the WebRTC data channel that provides a peer connection to the fourth module 542(4).

WebRTC Data Channel: Provides the peer connection to the fourth module 542(4) used to exchange commands and responses between the second module 436(2) and the fourth module 542(4). This provides an encrypted, low-latency, efficient transport of RFID data from the RFID reader to the application. Files, including audio recordings, videos, and photos can also be exchanged so they can be recorded in the controller memory 436(4).

Network Communication: Provides standard communications to the local or wide area network or the internet.

The third module 436(3) represents reader-agnostic software implemented by the controller 336 that supports the higher-level functions of the controller 336. The third module 436(3) hosts the acquisition device's web server to implement the web browser on the RFID data access device 240. In particular, the third module 436(3) includes the following software that supports the following functions:

Web Server: A Web Server, such as Apache 2, provides web browser-accessible applications used to capture the data from the RFID reader 332, as well as configure and control the RFID reader. The web server provides the HTML5 pages, the JavaScript libraries, and JavaScript application code that provide the access device functionality.

HTML5: The web pages displayed on the access device's web browser are formatted according to the W3C standard HTML5. These pages are stored in the controller memory 436(4).

JavaScript: JavaScript libraries and application code are loaded by the web pages displayed on the access device and are used to provide the access device functionality (the application).

PHP Server: Provides configuration, user, and data capture capability for a database, such as a MySQL database by Oracle Corporation, stored in the controller memory 436(4). The database is accessed using server-side PHP (personal home page) code to maintain security.

The first module 436(1) is designed to convert the manufacturer-specific RFID data produced by the RFID reader 332 into a standardized, generic format for transmission to the RFID data access device 240 via the comm network 220. As such, if the RFID device 332 is replaced by another RFID device that has different RFID reader software, such as an RFID device from another manufacturer, then the reader-specific first module 436(1) needs to be modified with software specific to the new RFID device, but the reader-agnostic second and third modules 436(2) and 436(3) can be retained without replacement or even modification.

Figure 5:
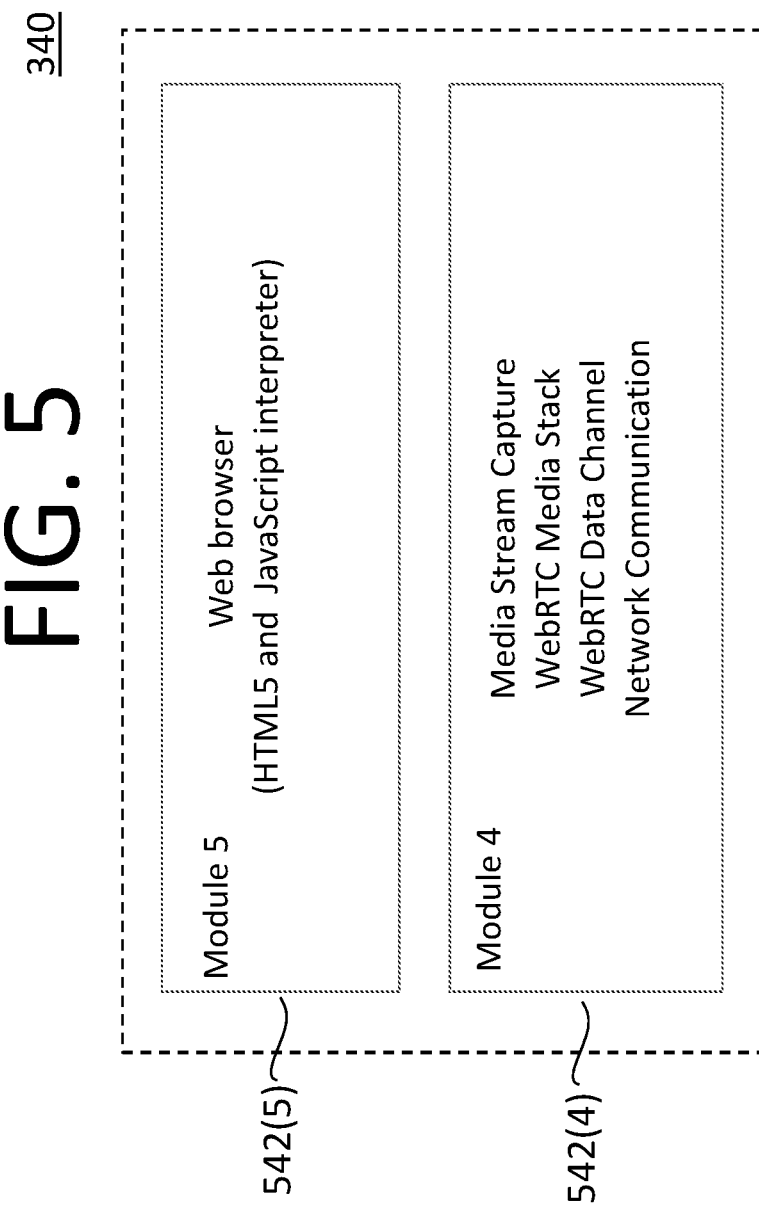
FIG. 5 is a high-level block diagram of the software implemented by the RFID data access device of FIG. 3.

FIG. 5 is a high-level block diagram of the software implemented by the RFID data access device 340 of FIG. 3. Because the first software module 436(1) of the controller 336 of the RFID data acquisition device 330 provides a standardized interface for other network nodes, like the access device 340, to communicate with the RFID reader 332, the software implemented by the access device 340 can be reader-agnostic, just like the second and third modules 436(2) and 436(3) of FIG. 4.

In particular, the fourth module 542(4) of FIG. 5 is analogous to the second module 436(2) of FIG. 4 and represents reader-agnostic software implemented by the access device 340 that supports the WebRTC P2P communications with the RFID data acquisition device 330 of FIG. 3. In particular, the fourth module 542(4) includes the following software that supports the following functions:

Media Stream Capture: The web browser provides access to any audio, camera, or video devices that are attached to the data access device 340.

WebRTC Media Stack: The web browser provides the WebAPI interface that is utilized by a JavaScript library in the fourth module 542(4) used to establish the WebRTC Media Stack. This may be accomplished using a general purpose WebRTC gateway such as Janus. This provides the peer connection to the second module 436(2).

WebRTC Data Channel: Provides the peer connection to the second module 436(2) used to exchange commands and responses between the second module 436(2) and the fourth module 542(4).

Network Communication: Provides standard communications to the local or wide area network or the internet.

Similarly, the fifth module 542(5) of FIG. 5 is analogous to the third module 436(3) of FIG. 4 and represents reader-agnostic software implemented by the access device 340 that supports the higher-level functions of the access device. In particular, the fifth module 542(5) includes the following software that supports the following functions:

Web Browser: The Web Browser, such as Chrome or Firefox, used to access the web server on the third module 436(3) to load an application that includes libraries to initiate a WebRTC connection to the WebRTC module on the controller 336.

HTML5: The Web Browser provides the interpretation and rendering of HTML5 standard web pages loaded from the third module 436(3).

JavaScript Interpreter: The Web Browser provides the interpretation of the JavaScript libraries and application code loaded from the third module 436(3).

Because the RFID data access device 340 implements only reader-agnostic software, if and when the RFID reader 332 of FIG. 3 gets replaced by another RFID device that has different RFID reader software, such as an RFID device from another manufacturer, the fourth and fifth modules 542(4) and 542(5), in particular, and the access device 340, in general, can be retained without any modification.

Figure 6:
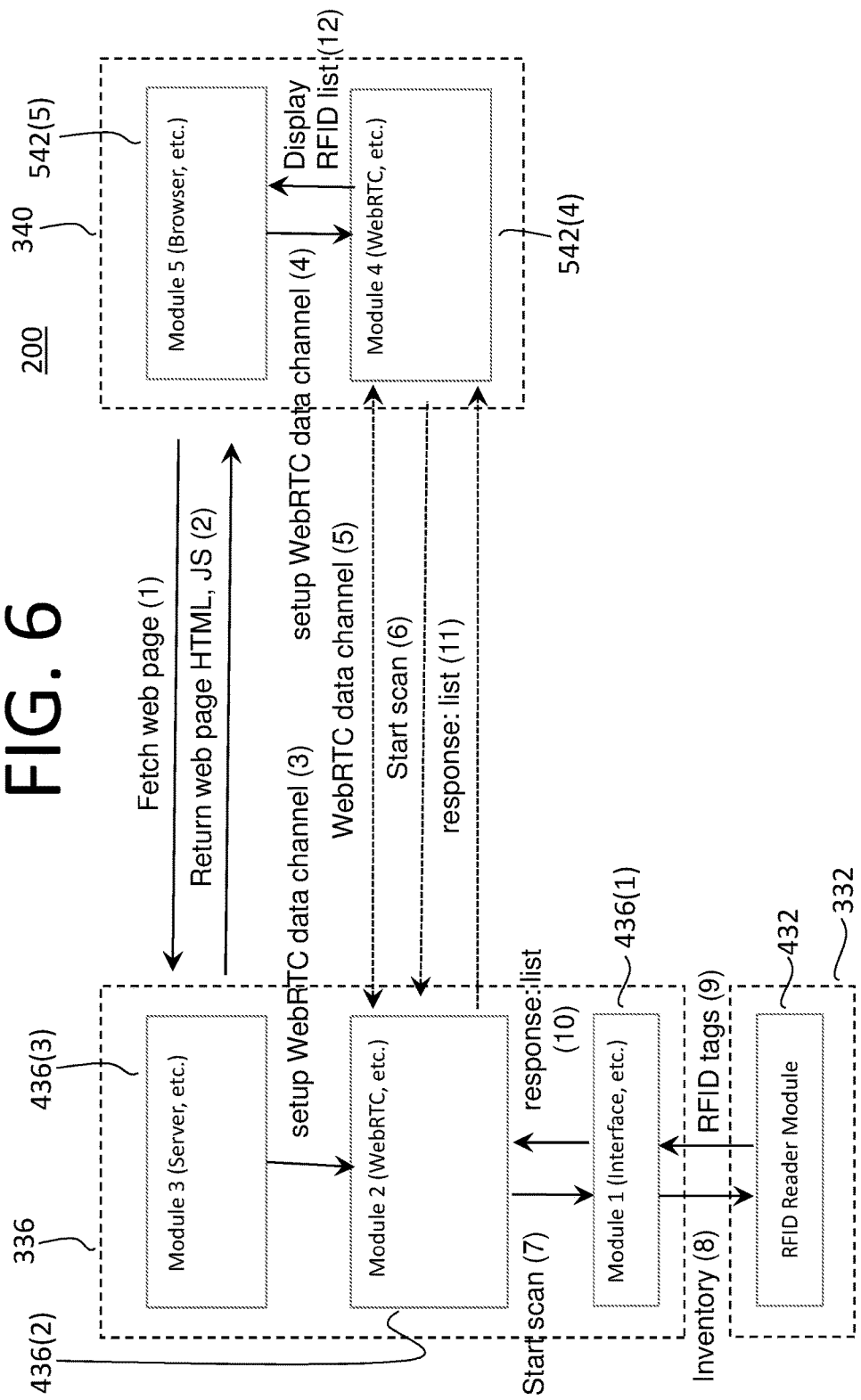
FIG. 6 represents the control and message flows between the various modules of the RFID data acquisition device and the RFID data access device of FIG. 3.

FIG. 6 represents the control and message flows between the various modules of the RFID data acquisition device 330 and the RFID data access device 340 of FIG. 3. The devices use the JSON (JavaScript Object Notation) format to exchange commands and responses via the data channel. The access device 340 transmits commands to the acquisition device 330, which replies by transmitting a response back to the access device. In addition, unsolicited responses may be sent by the acquisition device 330 to the access device 340. New fields may be added to any request or response without affecting protocol compatibility. The transport for the protocol is defined by the API used to exchange the data. Commands may be passed through multiple APIs, or they can be exchanged between a single API level. The solid arrows indicate the data flow for the HTTP and API requests, while the dotted arrows indicate the data flow used for the P2P WebRTC communications. FIG. 6 represents processing that is implemented after the acquisition device 330 and/or the access device 340 communicate with the network server 210 of FIG. 2 using the WebRTC Rendezvous function to establish the P2P communication path between the acquisition and access devices.

The web server in the third module 436(3) of the RFID data acquisition device 330 supports a web page that allows access devices, such as the RFID data access device 340, to access RFID data acquired by the acquisition device 330. In step (1) of FIG. 6, the access device 340 uses the web browser in the fifth module 542(5) to fetch the HTML5 and JavaScript code for the RFID data acquisition web page from the web server in the third module 436(3) of the acquisition device 330. In step (2), the acquisition device's web server provides the HTML5 and JavaScript code for the web page to the access device's web browser. In concurrent steps (3) and (4), the JavaScript codes in both the acquisition device 330 and the access device 340 load the Janus libraries and establish a WebRTC connection between the acquisition device's second module 436(2) and the access device's fourth module 542(4), thereby establishing, in step (5), a WebRTC data channel.

The RFID data acquisition web page presented on the access device 340 presents the access device's user with a graphical user interface (GUI) that can be used to start an RFID scan, which results, in step (6), in a "start scan" command being sent over the WebRTC data channel from the access device's fourth module 542(4) to the acquisition device's second module 436(2). In step (7), the "start scan" command is sent within the acquisition device's controller 336 from the second module 436(2) to the first module 436(1), and, in step (8), from the controller's first module 436(1) to the RFID reader module 432 on the RFID reader 332 via the reader-specific API.

In step (9), the RFID reader module 432 will begin reporting to the controller's first module 436(1) via the reader-specific API the IDs of any RFID tags that are within communication range of the RFID reader 332. The first module 436(1) converts the RFID data from the reader-specific format to a generic, standardized format and, in step (10), provides the resulting reader-agnostic data to the second module 436(2), which, in step (11) transmits that RFID data over the WebRTC data channel to the access device's fourth module 542(4). In step (12), the received RFID data is presented to the access device's fifth module 542(5) for rendering on the web page displayed to the access device user.

Although not represented in FIG. 6, the web page also provides a "stop scan" GUI that the user can use to stop the acquisition device 330 from reporting RFID data to the access device 340. Other messaging and commands between the acquisition device 330 and the access device 340 occur in a similar manner.

Figure 7:
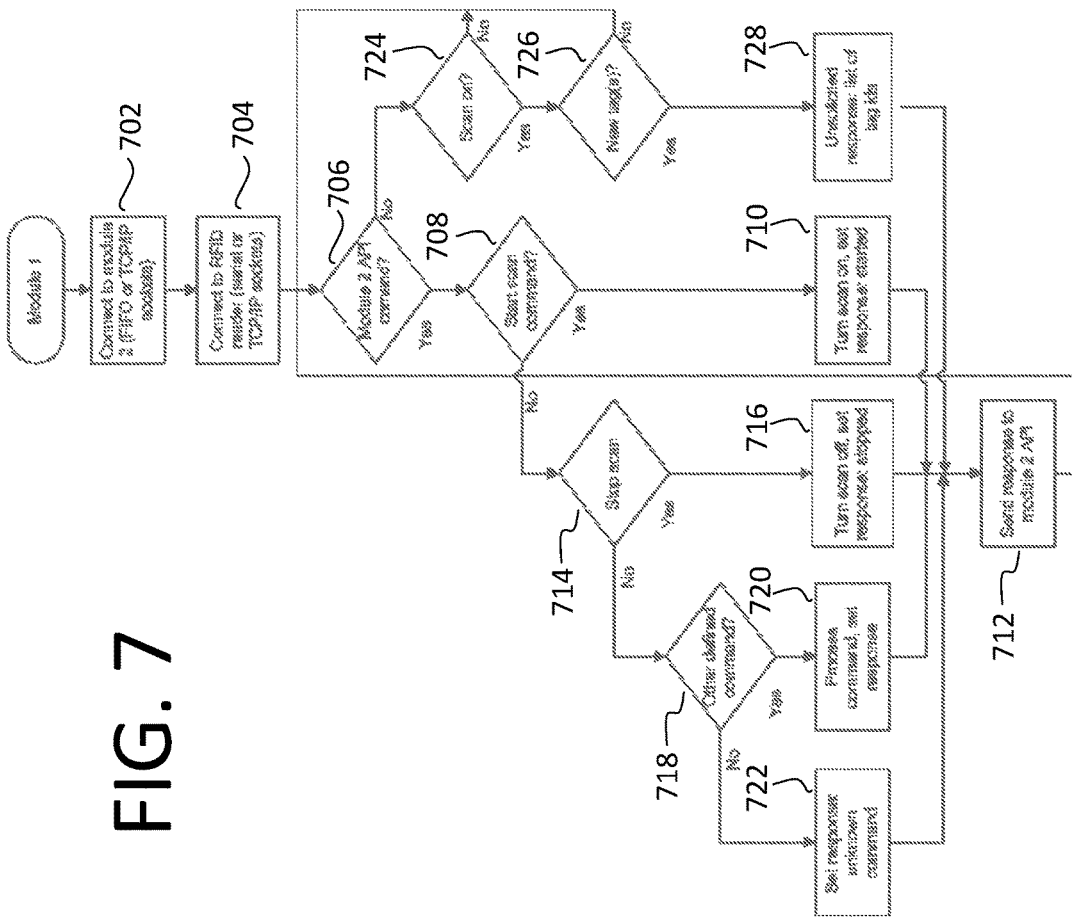
FIG. 7 is a flow diagram representing some of the processing implemented in the first module 436(1) of the controller 336 of the RFID data acquisition device of FIG. 3.

FIG. 7 is a flow diagram representing some of the processing implemented in the first module 436(1) of the controller 336 of the RFID data acquisition device 330 of FIGS. 3 and 4. In step 702, the first module 436(1) establishes communications with the second module 436(2) using FIFO or TCP/IP sockets. In step 704, the first module 436(1) establishes communications with the RFID reader module 432 using the serial wireline comm link 334.

In step 706, the first module 436(1) determines whether a reader-agnostic message has been received from the second module 436(2). If a message has been received, then, in step 708, the first module 436(1) determines whether the received message is a "start scan" command. If so, then, in step 710, the first module 436(1) turns its scan-mode processing on and defines a response to indicate that the scan has been started. Processing then continues to step 712, where the first module 436(1) sends the response to the second module 436(2) via the communications link established in step 702. Processing then returns to step 706 to determine whether another message has been received from the second module 436(2).

If, in step 708, the first module 436(1) determines that the received message is not a "start scan" command, then, in step 714, the first module 436(1) determines whether the received message is a "stop scan" command. If so, then, in step 716, the first module 436(1) defines the response to indicate that the scan has been stopped before processing proceeds to step 712.

If, in step 714, the first module 436(1) determines that the received message is not a "stop scan" command, then, in step 718, the first module 436(1) determines whether the received message is some other defined command. If so, then, in step 720, the first module 436(1) processes the command and defines an appropriate response before processing proceeds to step 712. If not, then, in step 722, the first module 436(1) defines the response to indicate that the command is unknown before processing proceeds to step 712.

If, in step 706, the first module 436(1) determines that a message has not been received from the second module 436(2), then, in step 724, the first module 436(1) determines whether a scan is already on. If so, then, in step 726, the first module 436(1) determines whether any new RFID data has been received from the RFID reader 332 via the comm link 334 established in step 704. If so, then, in step 728, the first module 436(1) converts the reader-specific RFID data received from the RFID reader module 432 into reader-agnostic RFID data and defines the response to include the reader-agnostic RFID data before processing proceeds to step 712. If the first module 436(1) determines, in step 724, that a scan is not on or, in step 726, that no new RFID data has been received, then processing returns to step 706.

In step 712, the response generated by one of the steps 710, 716, 720, 722, or 728 is sent to the second module 436(2), using the link established in step 702, and then processing returns to step 706.

Figure 8:
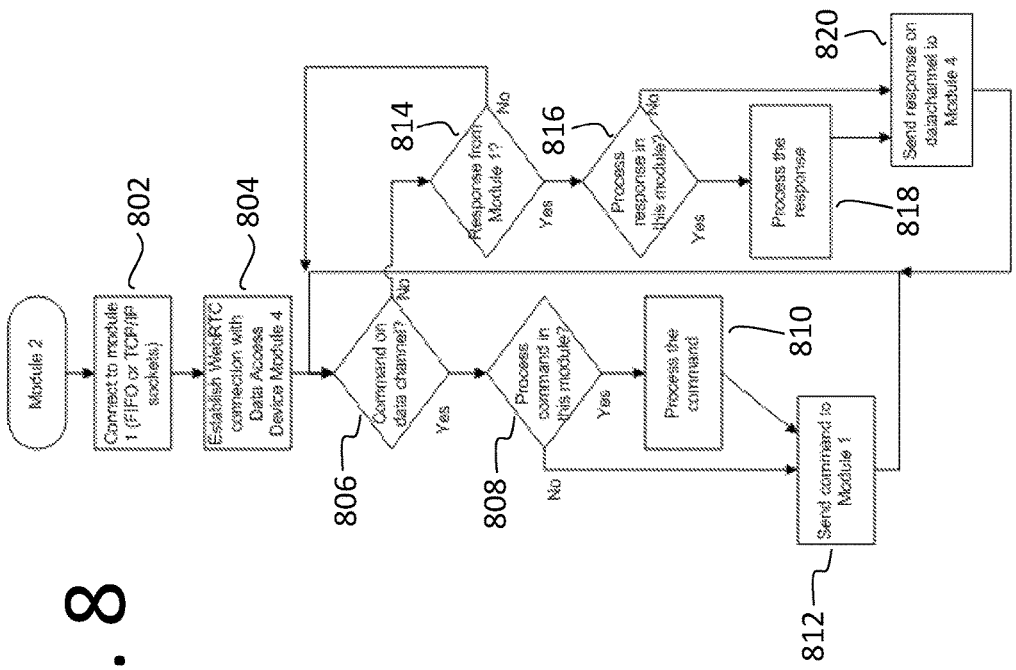
FIG. 8 is a flow diagram representing some of the processing implemented in the second module 436(2) of the controller 336 of the RFID data acquisition device of FIG. 3.

FIG. 8 is a flow diagram representing some of the processing implemented in the second module 436(2) of the controller 336 of the RFID data acquisition device 330 of FIGS. 3 and 4. In step 802, the second module 436(2) establishes communications with the first module 436(1) using FIFO or TCP/IP sockets. In step 804, the second module 436(2) establishes a webRTC connection with the fourth module 542(4).

In step 806, the second module 436(2) determines whether a reader-agnostic message has been received from the fourth module 542(4). If a message has been received, then, in step 808, the second module 436(2) determines whether the received message needs to be processed. If so, then, in step 810, the second module 436(2) processes the message. In either case, processing then continues to step 812, where the second module 436(2) sends the message to the first module 436(1) via the communications link established in step 802. Processing then returns to step 806 to determine whether another message has been received from the fourth module 542(4).

If, in step 806, the second module 436(2) determines that a message has not been received from the fourth module 542(4), then, in step 814, the second module 436(2) determines whether a response message has been received from the first module 436(1). If so, then, in step 816, the second module 436(2) determines whether the received message needs to be processed. If so, then, in step 818, the second module 436(2) processes the response message. Processing then continues to step 820, where the received response message is sent to the fourth module 542(4) using the webRTC link established in step 804. Processing then returns to step 806 to determine whether another message has been received from the fourth module 542(4).

The third module 436(3) of the controller 336 of the RFID data acquisition device 330 of FIG. 3 is implemented using standard components such as a web server, a php interpreter, database, and storage for the HTML5, style sheets, and javascript. As such, no flow diagram is provided for this module.

Figure 9:
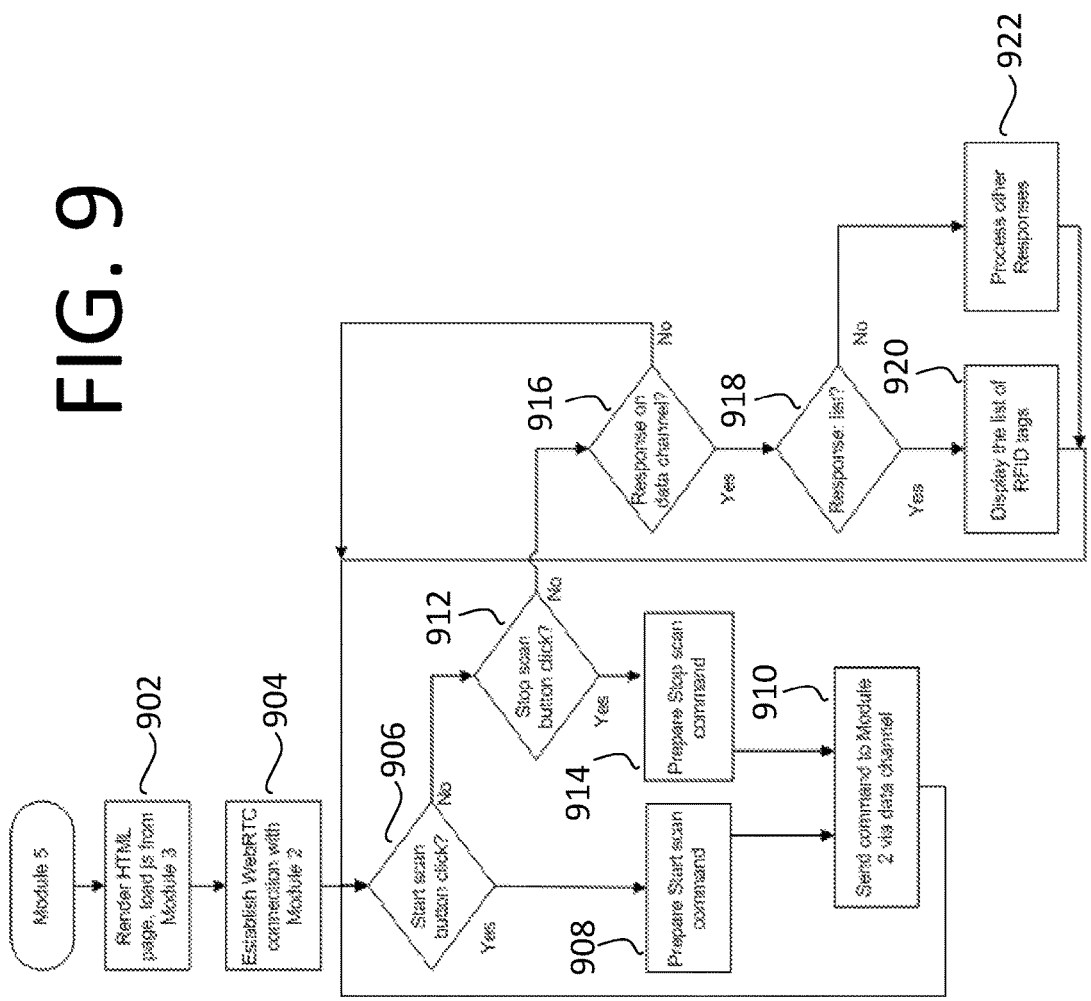
FIG. 9 is a flow diagram representing some of the processing implemented in the fourth and fifth modules 542(4) and 542(5) of the RFID data access device of FIG. 3.

FIG. 9 is a flow diagram representing some of the processing implemented in the fourth and fifth modules 542(4) and 542(5) of the RFID data access device 340 of FIG. 3. In step 902, the fourth module 542(4) and the fifth module 542(5) are downloaded from the third module 436(3). The download consists of HTML5 pages, CSS style sheets, and javascript code. The web page is displayed (by the fifth module 542(5)) and the javascript is executed (by the fourth module 542(4)). In step 904, the fourth module 542(4) establishes a webRTC connection with the second module 436(2).

In step 906, the fifth module 542(5) determines whether the start scan button has been clicked by the user. If so, then, in step 908, a start scan message is prepared. Processing then continues to step 910, where the message is sent to the second module 436(2) using the webRTC link established in step 904.

If, in step 906, the fifth module 542(5) determines that the start scan button was not clicked, then, in step 912, the fifth module 542(5) determines whether the stop scan button has been clicked by the user. If so, then, in step 914, a stop scan message is prepared. Processing then continues to step 910, where the message is sent to the second module 436(2) using the webRTC link established in step 904.

After step 910 is completed, processing continues at step 906.

If, in step 912, the fifth module 542(5) determines that the stop scan button was not clicked, then, in step 916, the fourth module 542(4) determines whether a response message has been received from the second module 436(2) via the webRTC link established in step 904. If so, then, in step 918, the response message is analyzed to determine whether the response message contains a list containing RFID tags. If so, then, in step 920, the fifth module 542(5) displays the list of RFID tags.

If, in step 916, the fourth module 542(4) determines that no response message was received, then processing continues at step 906.

If, in step 918, the fourth module 542(4) determines that the response message did not contain a list of RFID tags, then, in step 922, the fourth module 542(4) processes the response message.

After step 920 or 922 is completed, processing continues at step 906.

The use of the WebRTC technology to transmit RFID data in the data acquisition system 200 of FIGS. 2 and 3 provides the following advantages:

Real Time: Data can be sent directly from the acquisition device to the access device with minimal latency and delays.

Security: Data can be encrypted directly between the two devices, inhibiting or even preventing eavesdropping or monitoring, even over public WiFi or other non-secure connections.

Flexibility: Any HTML5-compatible device can be used as the access device. No software installation is needed on the access device. Any PC (personal computer), tablet, or smartphone that has a browser can be used as the access device. No configuration is needed on the access device.

Efficiency: The architecture of FIGS. 2 and 3 can be highly efficient in terms of bandwidth usage and can also avoid the need for cloud server farms and their power consumption and operating costs.

Audio and Video Easily Added: Voice and video can be added to a WebRTC session, for example, to annotate or explain the data, again providing fast context and interpretation. This annotation is time synchronized with the data, so that the access device user can potentially see what happens when a particular data point is observed and/or judge temporal effects.

No special application software is required to be installed on an access device in order to access the RFID data. JavaScript within the web browser run by the access device allows fast and easy integration of the data into browser and Internet-based applications. The access device can be any device with a standard web browser and network connection, including (but not limited to) tablets and mobile phones.

WebRTC has a variety of identity mechanisms which could be used to enable temporary access to data. For example, an Identity Provider or a Certificate Authority-issued certificate could be used. The WebRTC data channel uses the Stream Control Transmission Protocol (SCTP), which gives options on the reliability of the data transport. For example, embodiments of the invention can select either a number of retransmissions or retransmissions for a fixed interval.

In a system having multiple acquisition devices, one of the acquisition devices may be configured to function as an access device for the other acquisition devices and be used as the central data repository allowing access to data collected by the entire system at a single point. Furthermore, in a system having multiple access devices, each access device may connect to any acquisition device's controller and share any of the RFID data with other network nodes, provided that such permission has been granted, e.g., by a master access device.

Figure 10:
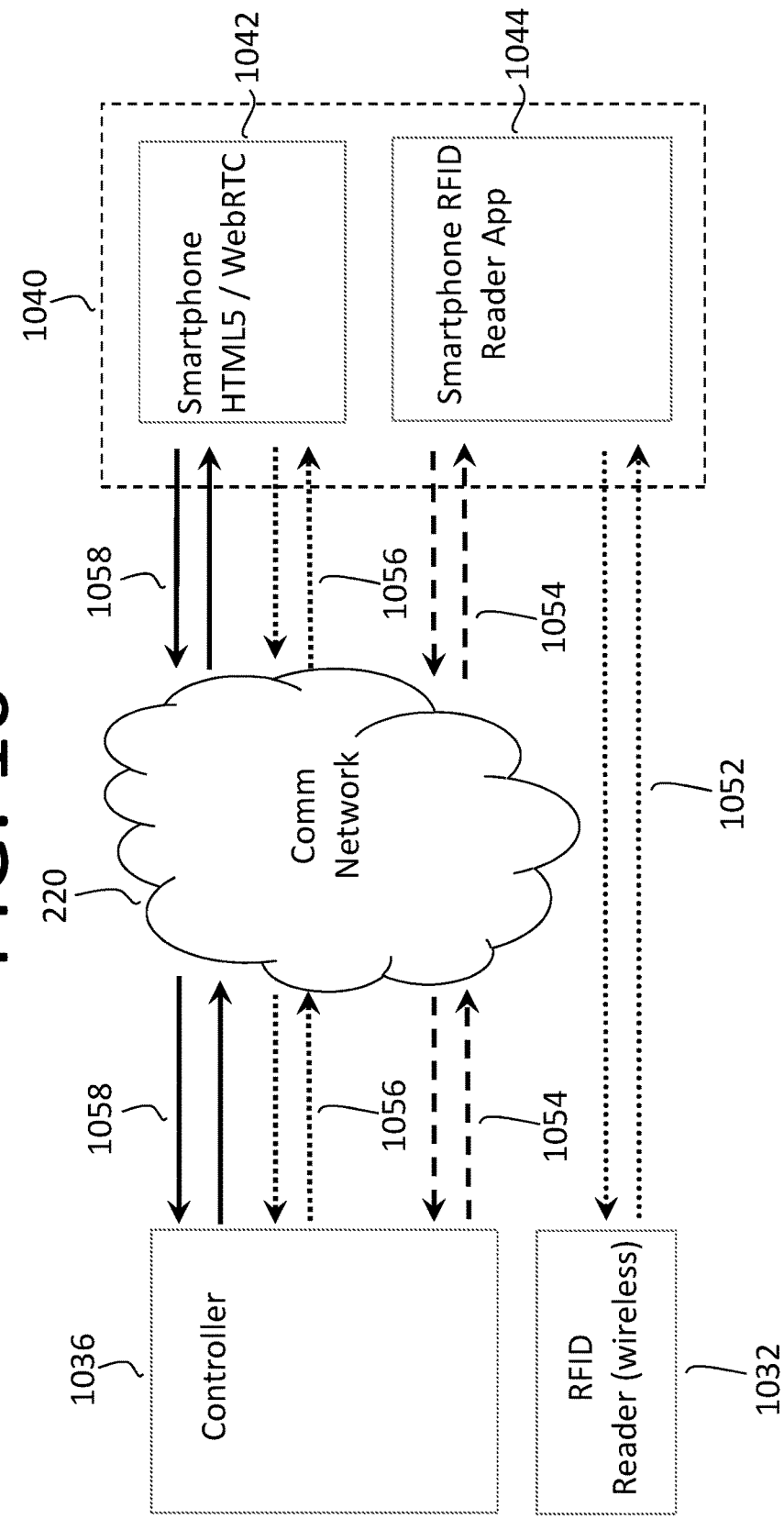
FIG. 10 is a simplified, high-level block diagram of another possible implementation of the RFID data acquisition system of FIG. 2.

FIG. 10 is a simplified, high-level block diagram of another possible implementation of the RFID data acquisition system 200 of FIG. 2. This implementation involves three distinct devices: an RFID reader 1032, a controller 1036, and a smartphone 1040, where the smartphone 1040 runs HTML5/WebRTC software 1042 and an RFID reader application (app) 1044. In this implementation, the RFID data acquisition device 230 of FIG. 2 is implemented by the RFID reader 1032, the controller 1036, and the RFID reader app 1044 on the smartphone 1040, while the RFID data access device 240 of FIG. 2 is implemented by the HTML5/WebRTC software 1042 on the smartphone 1040.

Figure 11:
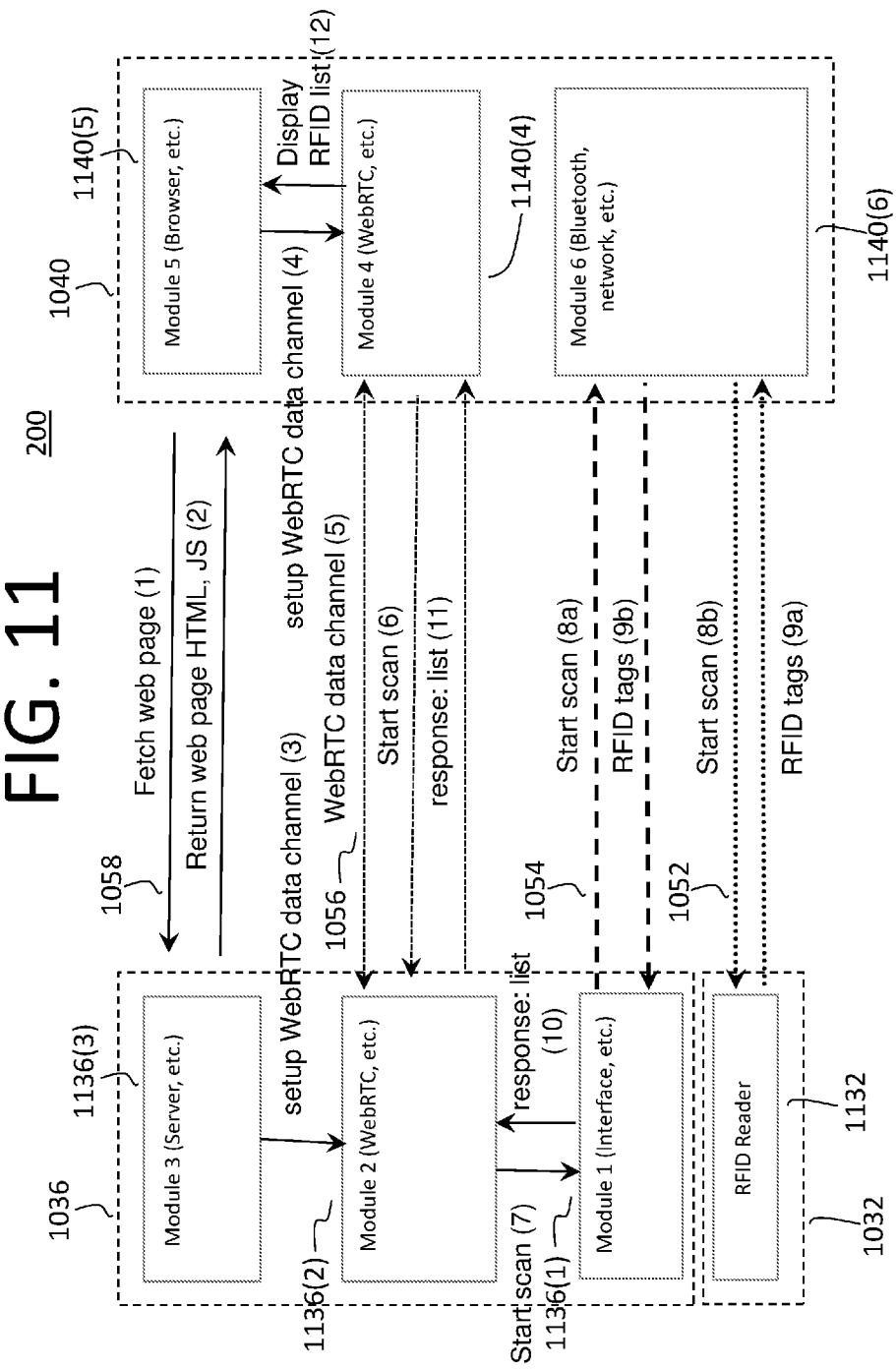
FIG. 11 represents the control and message flows between the various software modules of the RFID data acquisition system of FIG. 10.

FIG. 11 represents the control and message flows between the various software modules of the RFID data acquisition system 200 of FIG. 10. The RFID reader module 1132 represents the software run on the RFID reader 1032 of FIG. 10, the three modules 1136(1)-1136(3) represent the software run on the controller 1036 of FIG. 10, the three modules 1140(4)-1140(6) represent the software run on the smartphone 1040 of FIG. 10. Note that the analog of the controller memory 436(4) is not shown in FIG. 11, but is part of the controller 1036. The modules 1132, 1136(1)-1136(3), and 1140(4)-1140(5) are respectively analogous to the modules 432, 436(1)-436(3), and 542(4)-542(5) of FIGS. 4 and 5, with each module in FIG. 11 providing analogous if not identical functionality as its counterpart module.

In FIGS. 10 and 11, the dotted arrows represent a wireless (e.g., Bluetooth) comm link 1052 between the RFID reader module 1132 of the RFID reader 1032 and sixth module 1140(6) of FIG. 11, which includes the smartphone RFID reader app 1044 of FIG. 10. The long-dashed arrows represent a TCP/IP socket connection 1054 between the smartphone RFID reader app 1044/1140(6) and the first module 1136(1) of the controller 1036 via the comm network 220. The short-dashed arrows represent a WebRTC data channel 1056 between the second module 1136(2) of the controller and fourth module 1140(4) of the smartphone 1040. The solid arrows represent the web brower/server communication link 1058 between the web browser of the fifth module 1140(5) of the smartphone 1040 and the web server of the third module 1136(3) of the controller 1036.

In the system 200 of FIGS. 10 and 11, device-specific RFID data acquired from RFID tags (not shown) is transmitted (i) from the RFID reader module 1132 of the RFID reader 1032 to the smartphone RFID reader app 1044 via the wireless comm link 1052 and then (ii) from the smartphone RFID reader app 1044 to the first module 1136(1) of the controller 1036 via the TCP/IP socket connection 1054 through the comm network 220, where the device-specific RFID data is converted into device-agnostic RFID data. The device-agnostic RFID data is provided by the controller's first module 1136(1) to the controller's second module 1136(2), then transmitted from the controller's second module 1136(2) to the smartphone's fourth module 1140(4) via the WebRTC data channel 1056, and then provided by the smartphone's fourth module 1140(4) to the smartphone's fifth module 1140(5) for rendering on the smartphone's RFID web page.

Instead of software to handle a serial wireline connection, the controller's first module 1136(1) includes software to handle the TCP/IP socket connection 1054 with the smartphone's RFID reader app 1044. In addition to the smartphone's RFID reader app 1044, the smartphone's sixth module 1140(6) also includes software to handle the wireless comm link 1052 and software to handle the TCP/IP socket connection 1054 with the controller's first module 1136(1) via the comm network 220.

If the RFID device 1032 of FIGS. 10 and 11 is replaced by another RFID device that has different RFID reader software, such as an RFID device from another manufacturer, then the controller's reader-specific first module 1136(1) and the smartphone's sixth module 1140(6) needs to be replaced or at least modified with software specific to the new RFID device (e.g., including a new RFID reader app for the smartphone's sixth module 1140(6)), but the controller's reader-agnostic second and third modules 1136(2) and 1136(3) as well as the smartphone's fourth and fifth modules 1140(4) and 1140(5) can be retained without replacement or even modification.

The processing steps shown in FIG. 11 are analogous to the corresponding processing steps of FIG. 6, except that (i) step (8) of FIG. 6 is replaced by steps (8a) and (8b) of FIG. 11 and (ii) step (9) of FIG. 6 is replaced by steps (9a) and (9b) of FIG. 6 in order to accommodate the steps of transmitting the start scan command and the reader-specific RFID data via the smartphone's sixth module 1140(6).

An example of the RFID reader 1032 is the TSL 2.2 SDK RFID reader from Technology Solutions Limited of England, which supports the TSL ASCII Protocol 2.3.

Figure 12:
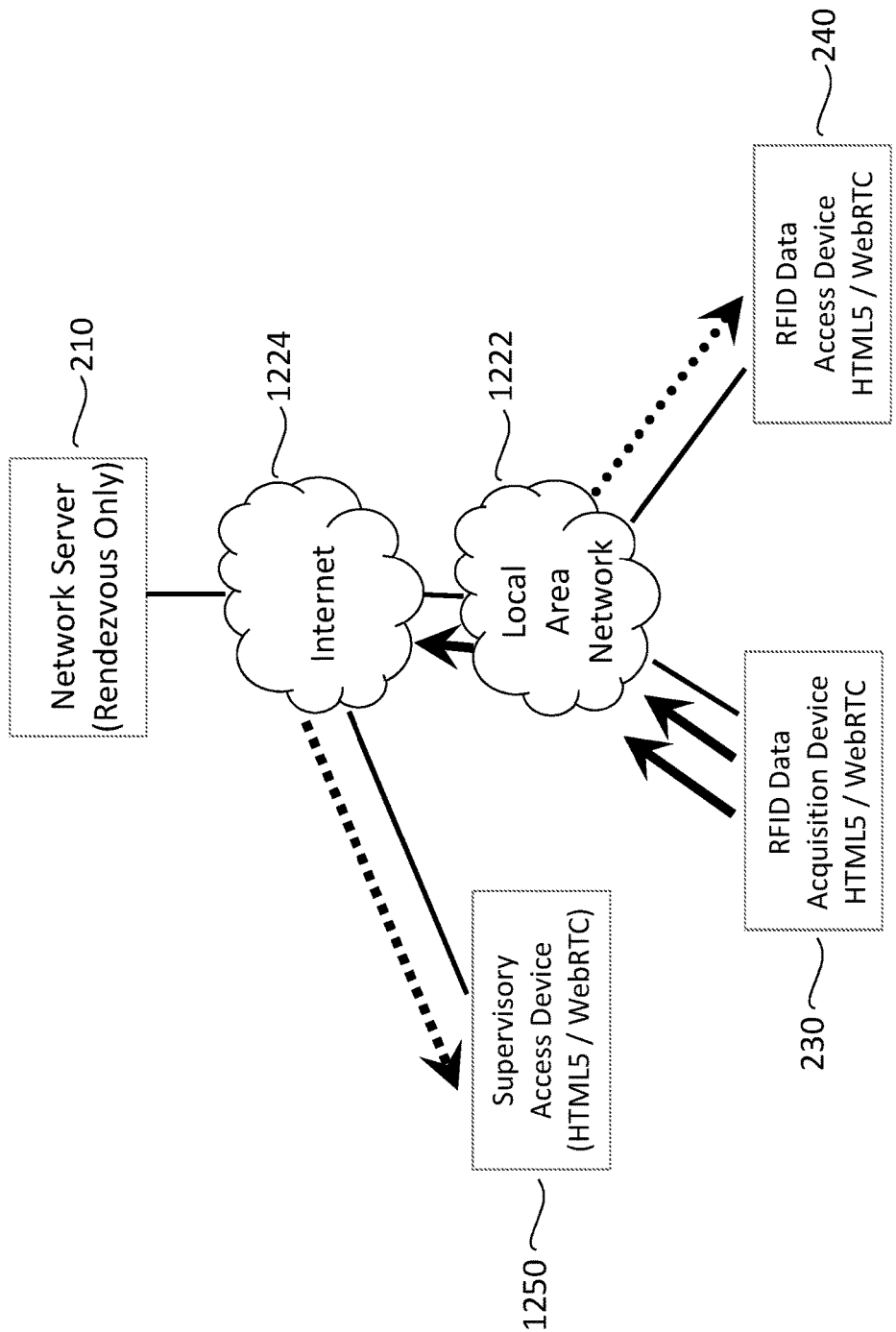
FIG. 12 is a simplified high-level block diagram of one possible implementation of the network-based RFID data acquisition system of FIG. 2 in which the comm network comprises a local-area network and the Internet.

FIG. 12 is a simplified high-level block diagram of one possible implementation of the network-based RFID data acquisition system 200 of FIG. 2 in which the comm network 220 comprises a local-area network 1222 and the Internet 1224. In addition to the RFID data acquisition device 230 and the RFID data access device 240, the implementation of FIG. 12 also includes a (e.g., remote) HTML5/WebRTC supervisory access device 1250. As shown in FIG. 12, the acquisition device 230 transmits reader-agnostic RFID data to the access device 240 via only the LAN 1222, while the acquisition device 230 transmits reader-agnostic RFID data to the supervisory access device 1250 via the LAN 1222 and the Internet 1224, but also without having to transmit the reader-agnostic RFID data to the network server 210. In implementations of system 200 having multiple instances of acquisition device 230 and/or multiple instances of access device 240, the remotely located supervisory access node 1250 can monitor all of the operations of the system 200.

One possible application for the RFID data acquisition system 200 of FIG. 2 is in the field of marijuana farming. Certain states require marijuana farming to be based on potted plants that are tracked as they are moved in and out of and between different greenhouse facilities. In one possible implementation, each potted marijuana plant has an affixed, unique RFID tag, and an instance of the RFID data acquisition device 330 of FIG. 3 is mounted at each greenhouse passageway such that, as any marijuana plant is moved through a greenhouse passageway, the corresponding acquisition device will read the RFID tag and transmit the corresponding reader-agnostic RFID data to one or more instances of the RFID data access device 340 of FIG. 3.

In another possible implementation, a user carries an instance of the RFID reader 1032 and an instance of the smartphone 1040 of FIG. 10, while an instance of the (remote) controller 1036 is stationary. As the user moves near a potted marijuana plant, the RFID reader 1032 will read the RFID tag and transmit the corresponding reader-specific RFID data to the RFID reader app on the smartphone 1040, which will then transmit the reader-specific RFID data to the controller 1036 of FIG. 10. The controller 1036 will convert the reader-specific RFID data into reader-agnostic RFID data and then transmit the reader-agnostic RFID data to the smartphone's reader-agnostic web browser for display to the user.

Figure 1:
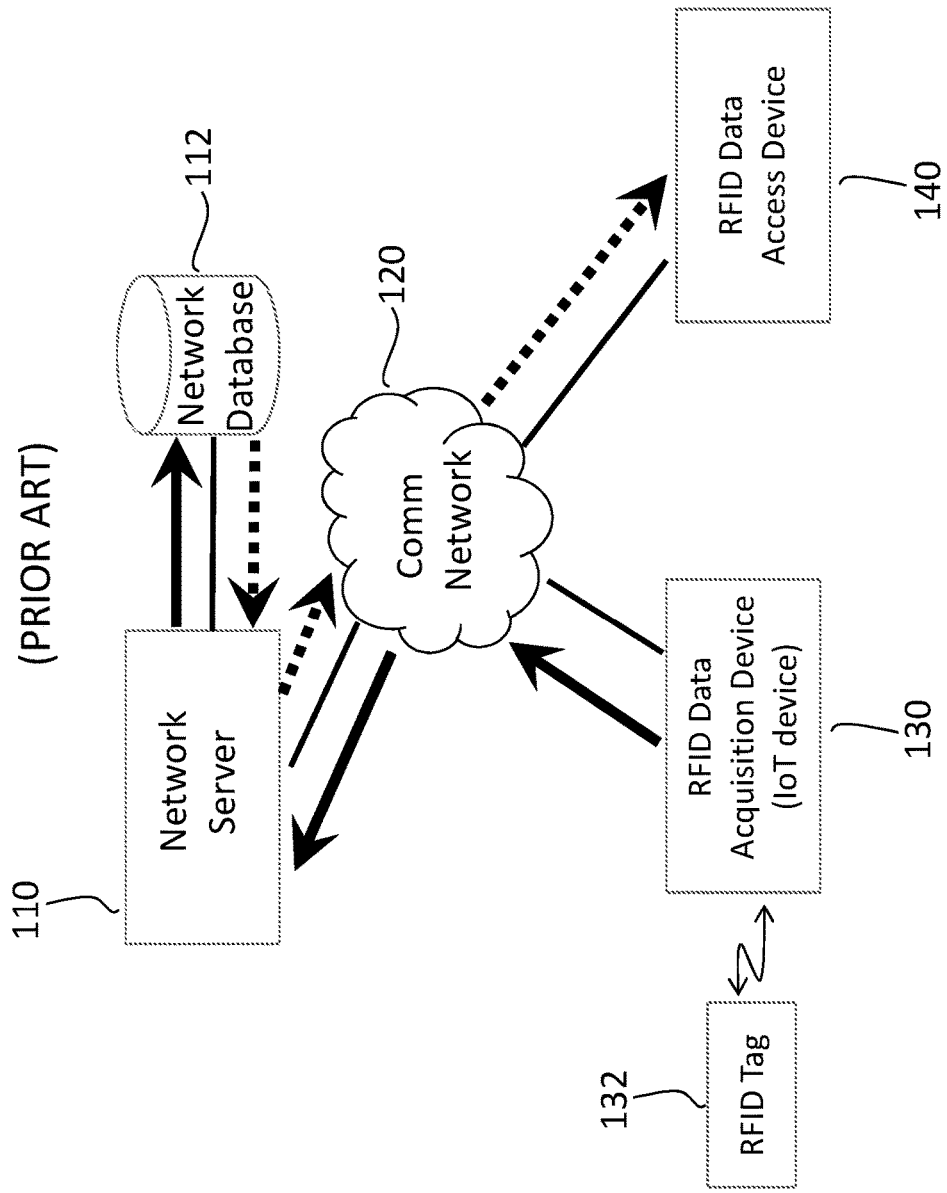
FIG. 1 is a simplified, high-level block diagram of a conventional network-based RFID data acquisition system that uses a traditional client/server architecture.

The present invention is also suitable for third-party temporary access to current RFID data. If RFID data is stored in the network database 112 of the conventional system 100 of FIG. 1, then the third party needs access to that database, which might contain much more information than the third party needs or is entitled to view. Inadvertent privacy breaches are likely. Instead, with certain embodiments of the present invention, the access is limited to the RFID data at that instant, and the access can be revoked as soon as the need goes away.

In one embodiment, an article of manufacture comprises a controller (e.g., 336, 1036) for a data acquisition device (e.g., 230, 330, 1032/1036) for a network-based data acquisition system (e.g., 200) having a communications network (e.g., 220) that supports communication between the acquisition device and a data access device (e.g., 240, 340, 1040). The controller comprises a reader-specific module (e.g., 436(1)) and at least one reader-agnostic module (e.g., 436(2)/436(3)). The reader-specific module is configured to (i) receive reader-specific data generated by a data reader (e.g., 332, 1032) in a reader-specific format and (ii) convert the reader-specific data from the reader-specific format into reader-agnostic data in a reader-agnostic format. The at least one reader-agnostic module is configured to (i) receive the reader-agnostic data from the reader-specific module and (ii) transmit the reader-agnostic data to the access device via a peer-to-peer (P2P) communication path.

In certain embodiments of the foregoing, the data reader is an RFID reader.

In certain embodiments of the foregoing, the acquisition device is configured to be communicatively connected to the data reader via a wireline communication link (e.g., 334), and the reader-specific module on the acquisition device is configured to communicate with the data reader via the wireline communication link.

In certain embodiments of the foregoing, the acquisition device is configured to be wirelessly communicatively connected to the data reader.

In certain embodiments of the foregoing, the acquisition device is configured such that the reader-specific data is transmitted (i) wirelessly from the data reader to a reader-specific application (e.g., 1044) on the access device and (ii) from the reader-specific application on the access device to the reader-specific module on the acquisition device via the communications network.

In certain embodiments of the foregoing, the access device is a smartphone.

In certain embodiments of the foregoing, the P2P communication path is a WebRTC data channel.

In certain embodiments of the foregoing, a web browser on the access device is configured to communicate with a web server on the acquisition device to request transmission of the reader-agnostic data from the acquisition device to the access device.

In certain embodiments of the foregoing, the acquisition device is configured to be modified to operate with a different data reader that generates reader-specific data having a different reader-specific format (i) by modifying or replacing the reader-specific module to provide a different reader-specific module that supports the different reader-specific format and (ii) without having to modify or replace the at least one reader-agnostic module.

In certain embodiments of the foregoing, the acquisition device is configured to be modified to operate with the different data reader without having to modify or replace the access device.

In certain embodiments of the foregoing, the article further comprises the data reader.

In certain embodiments of the foregoing, the article further comprises the access device.

In certain embodiments of the foregoing, the data reader is an RFID reader, the P2P communication path is a WebRTC data channel, a web browser on the access device is configured to communicate with a web server on the acquisition device to request transmission of the reader-agnostic RFID data from the acquisition device to the access device, the acquisition device is configured to be modified to operate with a different RFID reader that generates reader-specific RFID data having a different reader-specific format (i) by modifying or replacing the reader-specific module to provide a different reader-specific module that supports the different reader-specific format and (ii) without having to modify or replace the at least one reader-agnostic module, and the acquisition device is configured to be modified to operate with the different RFID reader without having to modify or replace the access device.

In certain embodiments of the foregoing, the acquisition device is configured to be communicatively connected to the RFID reader via a wireline communication link (e.g., 334), and the reader-specific module on the acquisition device is configured to communicate with the RFID reader via the wireline communication link.

In certain embodiments of the foregoing, the acquisition device is configured to be wirelessly communicatively connected to the RFID reader, the acquisition device is configured such that the reader-specific RFID data is transmitted (i) wirelessly from the RFID reader to a reader-specific application (e.g., 1044) on the access device and (ii) from the reader-specific application on the access device to the reader-specific module on the acquisition device via the communications network, and the access device is a smartphone or tablet.

In certain embodiments of the foregoing, the article further comprises the RFID reader.

In certain embodiments of the foregoing, the article further comprises the access device.

Although the invention has been described in the context of HTML5/WebRTC devices, the invention is not so limited. The invention can be implemented in the context of devices other than HTML5-compatible devices that can access the Internet or other suitable communications network and/or devices other than WebRTC-compatible devices that can support P2P communications with other such devices over a suitable communications network.

Although the invention has been described in the context of RFID data acquisition devices that have a single reader-specific module (e.g., the controller's first module 436(1)/1136(1)) configured to communicate with a single, specific RFID reader (e.g., RFID reader 332/1032), in alternative embodiments, an RFID data acquisition device can be provisioned with two or more different reader-specific modules, each one designed to communicate with a different, specific RFID reader. The same set of reader-agnostic modules (e.g., the controller's second and third modules 436(2)/1136(2) and 436(3)/1136(3) and the access device's fourth and fifth modules 542(4)/1140(4) and 542(5)/1140(5)) can be used with any of the different reader-specific modules. Similarly, the smartphone 1040 can be configured with two or more different RFID reader apps, each one corresponding to a different, specific RFID reader.

Although the invention has been described in the context of network-based RFID data acquisition systems having data acquisition devices having RFID readers, the invention can be implemented in the context of other types of network-based data acquisition systems having other types of data acquisition devices. For example, the invention can be implemented in the context of network-based data acquisition systems having data acquisition devices having bar code readers or any other suitable type of data reader.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system."

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any networks shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. An article of manufacture comprising a controller for a data acquisition device for a network-based data acquisition system having a communications network that supports communication between the acquisition device and a data access device, wherein the controller comprises:

a reader-specific module configured to (i) receive reader-specific data generated by a data reader in a reader-specific format and (ii) convert the reader-specific data from the reader-specific format into reader-agnostic data in a reader- agnostic format; and at least one reader-agnostic module configured to (i) receive the reader-agnostic data from the reader-specific module and (ii) transmit the reader-agnostic data to the data access device via a peer-to-peer (P2P) communication path.

2. The article of claim 1, wherein the data reader is an RFID reader.

3. The article of claim 1, wherein:

the acquisition device is configured to be communicatively connected to the data reader via a wireline communication link; and the reader-specific module on the acquisition device is configured to communicate with the data reader via the wireline communication link.

4. The article of claim 1, wherein the acquisition device is configured to be wirelessly communicatively connected to the data reader.

5. The article of claim 4, wherein the acquisition device is configured such that:

the reader-specific data is transmitted (i) wirelessly from the data reader to a reader-specific application on the data access device and (ii) from the reader-specific application on the access device to the reader-specific module on the acquisition device via the communications network.

6. The article of claim 5, wherein the data access device is a smartphone.

7. The article of claim 1, wherein the P2P communication path is a WebRTC data channel.

8. The article of claim 1, wherein a web browser on the data access device is configured to communicate with a web server on the acquisition device to request transmission of the reader-agnostic data from the acquisition device to the data access device.

9. The article of claim 1, wherein the acquisition device is configured to be modified to operate with a different data reader that generates reader-specific data having a different reader-specific format (i) by modifying or replacing the reader-specific module to provide a different reader-specific module that supports the different reader-specific format and (ii) without having to modify or replace the at least one reader-agnostic module.

10. The article of claim 9, wherein the acquisition device is configured to be modified to operate with the different data reader without having to modify or replace the data access device.

11. The article of claim 1, wherein the article further comprises the data reader.

12. The article of claim 1, wherein the article further comprises the data access device.

13. The article of claim 1, wherein:

the data reader is an RFID reader;

the P2P communication path is a WebRTC data channel;

a web browser on the data access device is configured to communicate with a web server on the acquisition device to request transmission of the reader-agnostic RFID data from the acquisition device to the data access device;

the acquisition device is configured to be modified to operate with a different RFID reader that generates reader-specific RFID data having a different reader-specific format (i) by modifying or replacing the reader-specific module to provide a different reader-specific module that supports the different reader-specific format and (ii) without having to modify or replace the at least one reader-agnostic module; and the acquisition device is configured to be modified to operate with the different RFID reader without having to modify or replace the data access device.

14. The article of claim 13, wherein:

the acquisition device is configured to be communicatively connected to the RFID reader via a wireline communication link; and the reader-specific module on the acquisition device is configured to communicate with the RFID reader via the wireline communication link.

15. The article of claim 13, wherein:

the acquisition device is configured to be wirelessly communicatively connected to the RFID reader;

the acquisition device is configured such that the reader-specific RFID data is transmitted (i) wirelessly from the RFID reader to a reader-specific application on the data access device and (ii) from the reader-specific application on the data access device to the reader-specific module on the acquisition device via the communications network; and the data access device is a smartphone or tablet.

16. The article of claim 13, wherein the article further comprises the RFID reader.

17. The article of claim 13, wherein the article further comprises the data access device.

* * * * *